May 13, 1952 L. THOMS 2,596,922
TORSION BAR SUSPENSION FOR INDIVIDUAL WHEEL MOUNTINGS
Filed Jan. 31, 1948 3 Sheets-Sheet 2
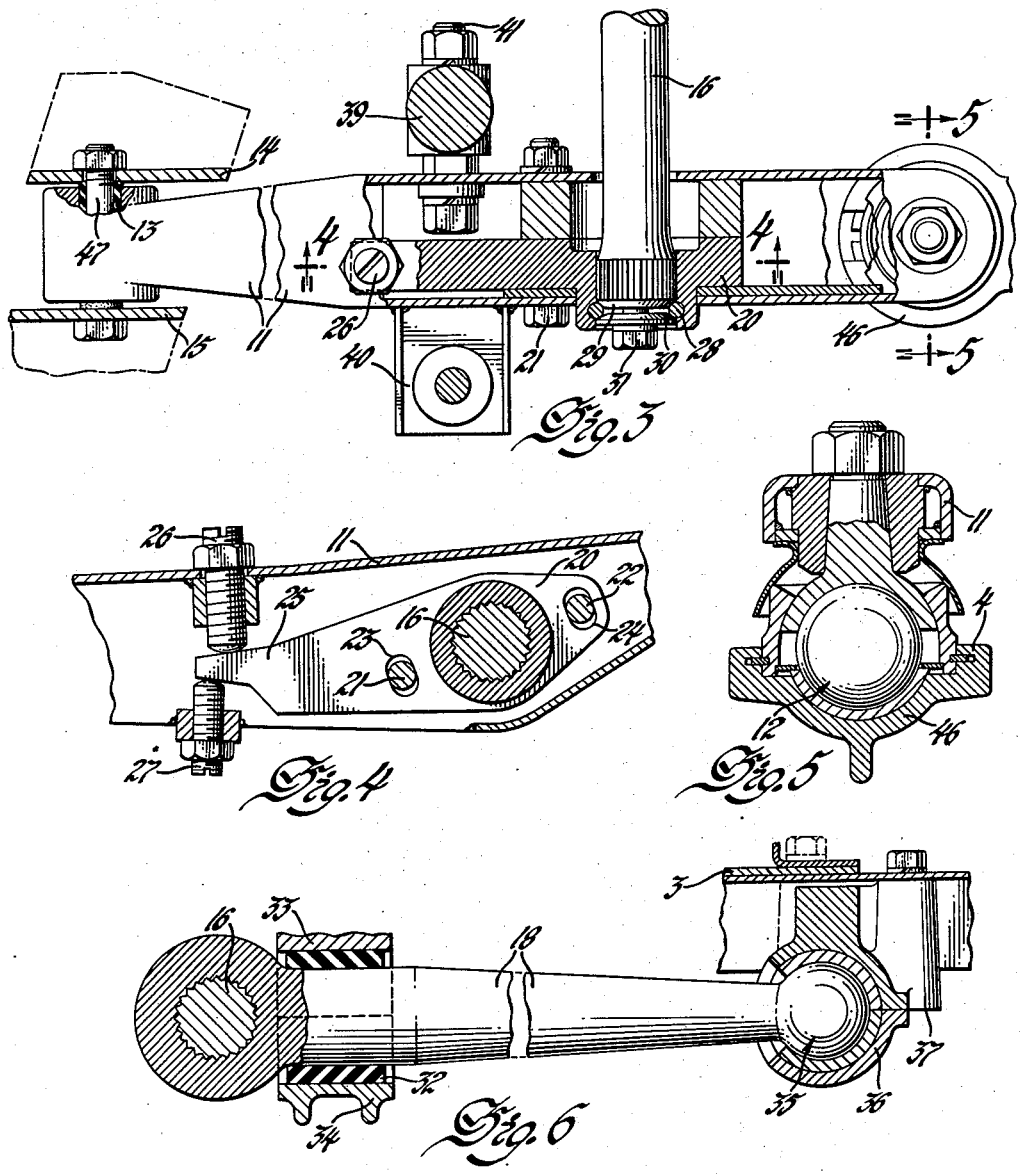
Inventor
Louis Thoms
By
Spencer, Willits, Helmig & Baillie
Attorneys

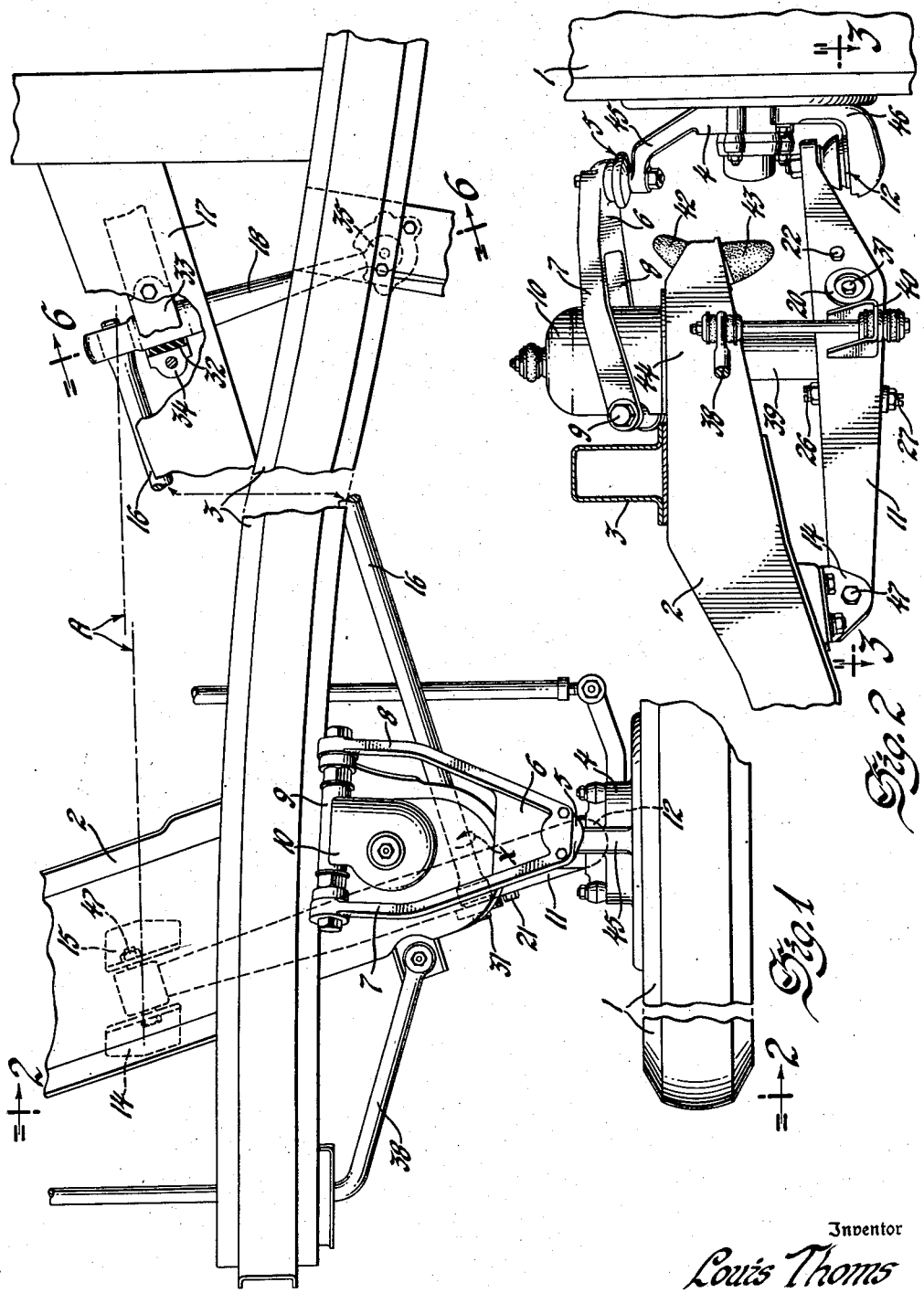

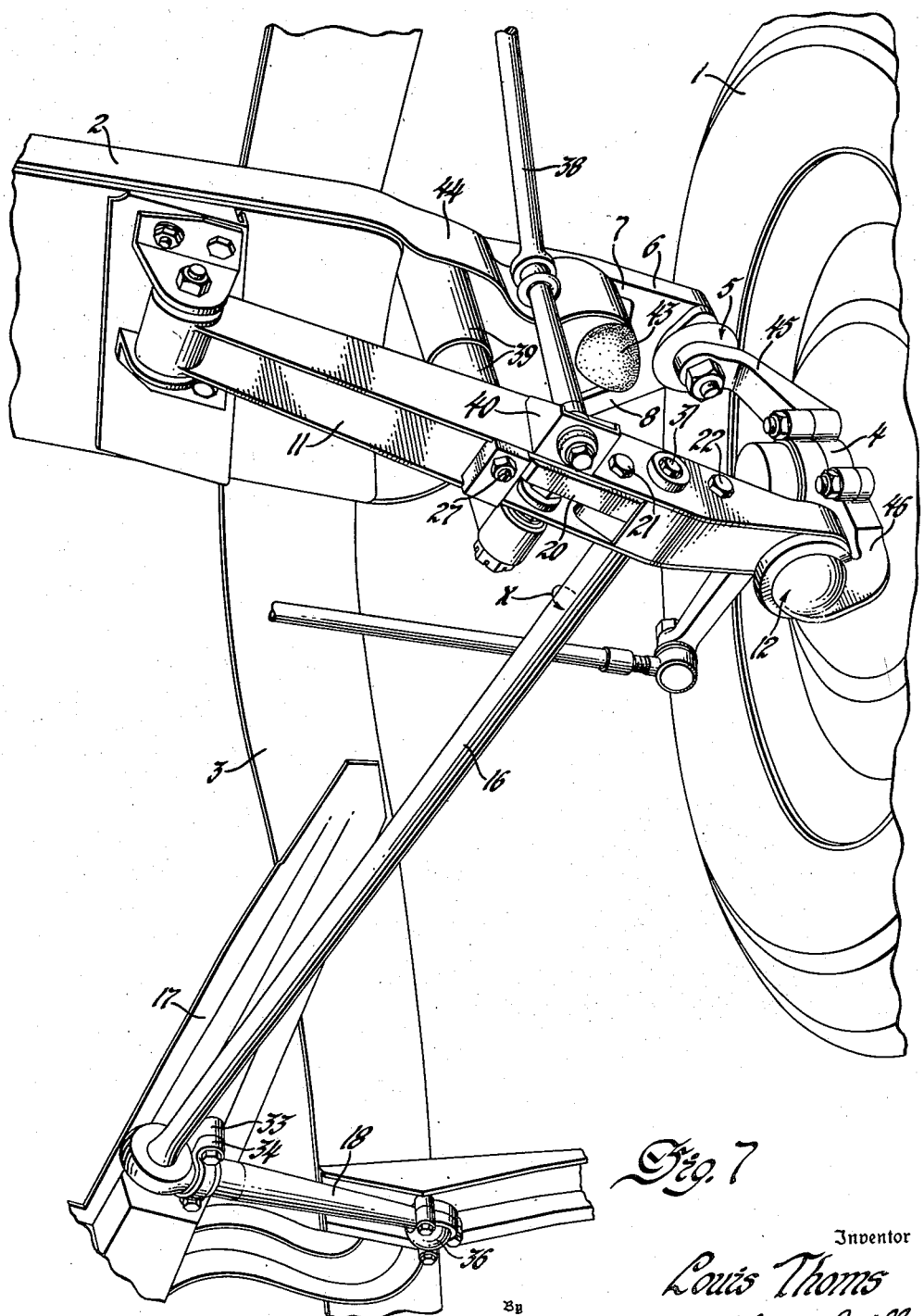

Patented May 13, 1952

2,596,922

UNITED STATES PATENT OFFICE 2,596,922

TORSION BAR SUSPENSION FOR INDIVIDUAL WHEEL MOUNTINGS

Louis Thoms, Birmingham, Mich., assignor to General Motors Corporation, Detroit, Mich., a corporation of Delaware Application January 31, 1948, Serial No. 5,660

8 Claims. (Cl. 280—96.2)

This invention relates to spring suspensions, and particularly to spring suspensions of the type wherein relative displacement between the supported and supporting members is controlled by one or more links pivotally connected to each of the members.

In the conventional designs of such suspensions the supported member is cushioned from the supporting member by a spring between one of the members and the control link. Suspensions of this type are in common use today on automotive vehicles, particularly at the dirigibly mounted front road wheels; and for purposes of illustration the invention will be described with reference to such an application. It will be appreciated, however, that the invention may also be applied with advantage to the suspension of a vehicle from its non-dirigible road wheels.

Dirigible wheel suspensions of the type referred to usually comprise upper and lower control links extending transversely of the vehicle, with a coil load supporting spring disposed vertically between the lower link and the body frame. Each of the control links is generally in the form of a wishbone, comprising front and rear arms which diverge from their pivotal connection at the wheel support to spaced-apart pivot points on the frame or a cross-member thereof, for supporting the wheels under the thrusts directed longitudinally as well as transversely of the vehicle. In order to locate the coil spring close to the wheel for maximum spring action and still allow wheel steering clearance, a spring support such as an extension of the frame cross-member is provided which overhangs the sides of the frame.

A number of disadvantages exist in previous suspensions of the type referred to, particularly as applied to automotive dirigible wheels, among which are: (1) wheel thrusts directed longitudinally of the vehicle effect undesirable torsional and horizontal bending deflections in the cross-member or other section of the frame to which the control links are connected, (2) the overhanging cross-member or other spring support is subjected to undesirable vertical deflections resulting from the spring loads imposed thereon, and (3) service and design difficulties are magnified as the result of the crowded condition obtained with a coil spring mounted in the limited space available between the wheel and the side of the frame.

It is therefore the principal object of this invention to provide an improved spring suspension in which relative displacement between the supported and supporting members is controlled by a link having arms pivotally connected to each of the members, with one of the arms serving both as a torsion spring and as a thrust member.

It is a further object of this invention to provide an improved transverse link type suspension particularly adapted to avoid the aforementioned disadvantages existent in conventional dirigible wheel vehicle suspensions through the use of a control link of which one arm acts dually as a torsion bar spring to support the vehicle weight and as a longitudinal thrust resisting member.

It is a still further object of this invention to provide an improved transverse link type vehicle suspension which is materially cheaper to construct than those known to the prior art, yet affords very satisfactory vehicle riding qualities.

For a complete understanding of the invention by which these and other objects are attained, reference is made to the following description together with the drawings, in which:

Figure 1 is a plan view of an automotive left front wheel suspension embodying the invention.

Figure 2 is a front elevation viewed in the direction of the arrows on line 2—2 of Figure 1.

Figure 3 is an enlarged fragmentary plan view with parts broken away and in section substantially on line 3—3 of Figure 2.

Figure 4 is a fragmentary sectional view taken on line 4—4 of Figure 3.

Figure 5 is a sectional view taken on line 5—5 of Figure 3.

Figure 6 is a sectional view taken on line 6—6 of Figure 1.

Figure 7 is a perspective view of the suspension as seen from a point below, forward and inward of the vehicle's left front wheel.

Shown in the drawings are portions of the dirigible left front road wheel 1 and the suspended frame, including the front cross-member 2 and left side-member 3, of a typical automotive vehicle. The wheel 1 is carried by a steering knuckle 4 having an upwardly extending leg 45 connected through the upper ball joint 5 to the outer end of the upper transverse control link 6, the inner end of which has spread-apart front and rear arms 7 and 8 pivotally connected to an approximately horizontal upper pintle 9 fixed to the frame cross-member 2 through a dome-shaped shock-absorber cover 10.

The lower transverse control link comprises a pair of angularly related front and rear arms, with the rear arm functioning both as a torsion spring supporting the vehicle weight and as a longitudinal thrust member or strut. The front arm 11, which is of relatively rigid construction, is connected at its outer end through the lower ball joint 12 to the downwardly extending leg 46 on the steering knuckle, and is connected at its inner end through a flexible rubber bushing 13 to the lower pintle 47 mounted in brackets 14 and 15 on the cross-member 2 of the frame. The rear arm or torsion bar 16 has its outer or front end fixed to the front arm 11 and is anchored at its inner or rear end to the frame through an axially rotatable anchor member 18. To obtain maximum torsional spring action from the torsion bar 16 in operation, and to minimize horizontal deflection in the front arm 11 under longitudinal thrusts on the wheel 1, the fixed connection between the torsion bar 16 and front arm 11 is located as near the wheel as possible without creating interference with wheel steering. Further, to reduce its tendency to bow under longitudinally directed wheel thrusts, the torsion bar 16 is angularly disposed horizontalwise with respect to the vehicle longitudinal axis only to the extent necessary to avoid interference with wheel steering, and the front arm is disposed perpendicularly to the torsion bar.

The outer or front end of the torsion bar may be fixed to the front arm 11 in any desired manner, such as by splining it directly thereto or to an intermediate anchor member or dog 20, as shown. The dog 20 may be permanently secured to the arm as by rivets, etc.; or if desired for purposes of adjusting the vehicle height, the dog 20 may be provided as shown with elongated bolt holes 23 and 24 for passage of bolts 21 and 22 securing it to the arm, and with an extension 25 supported between adjustable set screws 26 and 27 threaded in the arm. Other provisions for adjusting the vehicle height (if such is desired) could be used; such as equal spacing of the splines around the torsion bar 16 and in the dog 20, which would permit their being intersplined in various relative positions. For ease of assembly and disassembly, the torsion bar may be secured against end-wise movement in the front arm 11 by a suitable key such as the snap ring 28 in the dog 20, the bevelled end 29 of the torsion bar being held there-against by a retainer such as the bevel-faced washer 30 secured to the end of the torsion bar by a bolt 31.

The inner or rear end of the torsion bar 16 is splined (see Figure 6) to one end of the anchor member 18, which is rotatably supported in a flexible rubber bushing 32 between bearing members or cups 33 and 34 secured to the frame brace 17 and has an integral ball 35 on its opposite end spherically seated between bearing members or sockets 36 and 37 secured to the frame side member 3. Since it acts as a pivot for the vertical components of the swinging movements of the torsion bar relative to the vehicle frame in operation, the anchor member 18 is preferably mounted with its rotatable axis perpendicular to the axis of the torsion bar and in the plane established by the normal mean operating positions of the torsion bar and the front arm 11. The inner or rear end of the torsion bar 16 is secured against end-wise movement in the anchor member 18 by means of a snap ring and washer retainer (not shown) in a manner similar to its end-wise securement in the dog 20 described above. The flexible rubber bushing 32 serves to cushion the vehicle frame from the thrust forces delivered from the road wheel through the torsion bar.

As shown most clearly in Figures 2 and 7, the ball joint 12 connecting the lower transverse control link and the steering knuckle is located substantially closer to the axis of the wheel 1 than is the upper transverse control link's ball joint 5, in order to concentrate the application of longitudinally directed wheel thrusts through the front arm 11 and torsion bar 16 of the lower link to the anchor member 18, and to minimize the application of such forces through the upper transverse link 6 to the frame cross-member 2.

A conventional horizontal stabilizer 38 and shock absorber 39 may be connected to the lower control link's front arm 11 in any desired manner, but preferably on opposite sides fore and aft thereof for reasons of balance. As shown, these connections are made respectively at brackets 40 and 41 fixed to the front arm 11, and the upper end of the shock absorber is secured through the dome-shaped cover 10 to the portion 44 of the cross-member 2 which overhangs or extends laterally outward from the frame side-member 3. Rubber bumpers 42 and 43 are secured to the overhanging cross-member portion 44, in positions to bear against the upper control link 6 and the lower control link's front arm 11, respectively, under conditions of extreme spring deflections.

In operation, the proportionate share of the sprung vehicle weight borne by the road wheel 1 is applied downwardly both upon the inner end of the lower control link's front arm 11 by the lower pintle 47 on the frame cross-member 2, and upon the inner or rear end of the torsion bar 16 by the anchor member 18 secured to the frame side-member 3 and frame brace 17. The resistance imposed by the ground, acting upwardly through the road wheel and the steering knuckle 4 to the lower ball joint 12 at the outer end of the lower control link's front arm 11, tends to cause this arm and the torsion bar 16 to swing about a common axis A (see Figure 1) extending through the intersection of the axis of the lower pintle 47 with the longitudinal centerline of the arm 11 and through the intersection of the longitudinal axes of the torsion bar 16 and anchor member 18. By reason of its outer or front end being fixed to the front arm 11, the tendency of the torsion bar 16 to swing about the anchor member 18 is also accompanied by a tendency of the torsion bar to rotate axially in the direction indicated by the arrow X in Figures 1 and 7. Such axial rotation is resisted at the inner or rear end of the torsion bar by the anchor member 18, with the result that a torsional stress is set up in the bar 16 which acts to elastically support the weight of the vehicle.

Although, as is shown in Figures 1 and 2, the axis of the lower pintle 47 is somewhat out-of-line with the axis A above referred to, no bending of the torsion bar results therefrom because the rubber bushing 13 and the lower ball joint 12 at opposite ends of the front arm 11 allows the latter to cock somewhat with respect to the lower pintle 47 during movement. While the misalignment referred to is not essential and may be easily avoided in the construction of the parts, it is not objectionable and has the practical advantage of simplifying the manufacture of lower front arms for left and right front wheel suspensions.

Because of the angularity of the torsion bar 16 to the axis A, about which it swings during vertical movements of the wheel relative to the vehicle, the swinging movements of the torsion bar have small transverse-wise components, and since such components are restrained by the anchor member 18, a certain amount of bending stress tends to be imposed thereby on the torsion bar during operation. While such stress could be eliminated by so mounting the anchor member 18 to permit it to swing freely about a vertical axis extending through the intersection of axis A and the longitudinal axis of the torsion bar, the amount of the transverse-wise swinging components referred to is sufficiently minute that they may be neglected.

The above described suspension forming a preferred embodiment of my invention possesses a number of important structural advantages over prior art designs. One of these advantages lies in the fact that an extremely wide spread is obtained between the members (arm 11 and bar 16) of the lower transverse link for bracing the road wheel against thrust forces directed longitudinally of the vehicle. Also, twisting of the frame cross-member 2 under such forces is greatly reduced by concentrating their application through the arm 11 and bar 16 from a point close to the wheel axis to a section of the frame well to the rear of the front cross-member.

A second important advantage in this suspension lies in the fact that the vertically directed spring loads on the frame are not concentrated at the cross-member 2 but are proportioned between the latter and a section of the frame substantially rearward thereof, inversely in accordance with the distances of those points longitudinally of the wheel axis. Also, it is to be noted that the overhanging portion 44 of the cross-member 2 is not subjected to the spring loads commonly imposed in dirigible wheel transverse link type suspensions employing coil springs.

Further, by making one arm of the lower transverse link serve both as a brace member or radius rod and as a torsion spring supporting the vehicle weight, the subject suspension not only avoids the design and service difficulties present in conventional transverse link suspensions which include coil springs in the limited space available therefor between the wheel and frame side member, but also affords a material saving in cost of construction.

I claim:

1. In a spring suspension between two relatively displaceable members, a pair of angularly related and rigidly interconnected arms secured to one of the members and having pivotal concentions with the other of the members at spaced apart points thereon, one of said arms constituting a torsionally elastic spring controlling the relative displacements of the members, the pivotal connection associated with the other arm being arranged to permit substantially unrestrained pivoting thereof about an axis extending through both of said points, and the pivotal connection associated with said one arm including an anchor element rigid with said one arm pivoted to said other member along an axis substantially divergent to said first named axis and located in the plane of the mean operative positions of said arms.

2. A link for controlling vertical movements of a ground wheel relative to a vehicle suspended therefrom, comprising two rigidly interconnected arms, one of the arms being of relatively rigid construction and having a portion disposed away from its connection with the other arm adapted to be pivotally connected to the vehicle about a generally horizontal first axis, said other arm constituting a torsion spring and extending generally perpendicularly from said one arm to said first axis, and an anchor member fixed to and extending generally perpendicularly of said other arm at said first axis, said anchor member having spaced apart bearing portions accomodating rotation of said anchor member about its longitudinal axis and restraining rotation of said anchor member about the longitudinal axis of said other arm.

3. In a spring suspension between two relatively displaceable members, a first arm connected to one of the members and having a pivotal connection about a first axis with the other of the members, and a second arm angularly disposed and rigidly connected to the first arm and having a pivotal connection with said other member about a second axis oblique to said first axis, said last named connection including anchor means rigid with said second arm and pivoted to said second member along said second axis, said second arm including a portion elastically yieldable torsionally to control relative displacement of the members.

4. In a spring suspension between a vehicle and one of its ground wheels, a generally transversely extending link comprising angularly disposed front and rear arms, one of the arms being pivotally connected to the wheel and pivotally connected to the vehicle, said last named pivotal connection being on an axis extending generally longitudinally of the vehicle, the other of the arms being rigidly joined to the first named arm at a point thereon adjacent the connection between the first named arm and wheel, and a pivotal connection between said other arm and the vehicle about an axis oblique to the longitudinal axis of the vehicle including anchor means rigid with said other arm and pivoted to the vehicle at spaced apart points along said oblique axis, said other arm including a torsionally elastic portion intermediate its connections to the first named arm and the vehicle constituting the principal spring element of the suspension.

5. In a spring suspension for a dirigibly mounted vehicle ground wheel, the combination of a vehicle frame, a steering knuckle, an upper transverse control link having a pivotal connection at its outer end with the steering knuckle and a pivotal connection at its inner end with the frame, a lower transverse control link comprising a rigid front arm and a rear arm, said front arm having a pivotal connection at its outer end with the steering knuckle and a pivotal connection at its inner end with the frame, said rear arm constituting a torsion bar spring rigidly connected at its outer end with the front arm and extending generally perpendicularly to the front arm, an anchor member rigidly connected to the rear arm at a point thereon lying substantially in the axis of movement of the front arm about its pivotal connection with the frame, and means rotatably secured spaced apart portions of said anchor member to the frame for rotation about an axis extending perpendicularly to the rear arm at said point thereon and restraining rotation of said anchor member about the longitudinal axis of the rear arm.

6. A link adapted to control vertical movements of a ground wheel relative to a vehicle suspended therefrom, comprising two angularly related and rigidly interconnected arms, one of the arms being of relatively rigid construction and terminating at one of its ends with a bearing portion accommodating pivotal movement of said one arm relative to the vehicle, the other of said arms constituting a torsion bar spring terminating at its end remote from said one arm with an anchor member substantially perpendicular to said other arm, said anchor member having longitudinally spaced apart bearing portions accommodating rotation of the anchor member about its longitudinal axis.

7. In a spring suspension for a vehicle having a frame and a road wheel, a first arm swingably connected at opposite ends thereof to the frame and wheel, a torsionally elastic second arm constituting the principal spring element of the suspension, said second arm being rigidly connected at one of its ends to the first arm and disposed generally perpendicularly thereto, an anchor member locked to the opposite end of the second arm, and means rotatably securing said anchor member to the frame for rotation about an axis generally perpendicular to the second arm.

8. The combination with a vehicle frame and wheel structure of a spring suspension comprising a substantially rigid link connected at one end to said wheel structure and an additional member having a portion formed to constitute a torsion spring bar and positioned angularly relative to said link, means securing one end of said member to said link adjacent the wheel structure and including means to lock said member to said link against rotation about its longitudinal axis, supporting means connecting the remote ends of said link and member respectively to said frame at spaced points and providing pivotal movement of the link and member about said points, the support for said member including means to lock said member to said frame against rotation about its axis, whereby swinging movement of said link and member effect twisting of said bar.

LOUIS THOMS.

REFERENCES CITED

The following references are of record in the file of this patent:

UNITED STATES PATENTS

| Number | Name | Date |
|---|---|---|
| 1,972,014 | Fraser | Aug. 28, 1934 |
| 2,048,866 | Hunt | July 28, 1936 |
| 2,082,509 | Rabe | June 1, 1937 |
| 2,105,132 | Soehner et al. | Jan. 11, 1938 |
| 2,226,406 | Krotz | Dec. 24, 1940 |
| 2,254,282 | Griswold | Sept. 2, 1941 |

FOREIGN PATENTS

| Number | Country | Date |
|---|---|---|
| 566,570 | Great Britain | Jan. 4, 1945 |
| 615,165 | Germany | June 8, 1935 |